United States Patent
Liu et al.

(10) Patent No.: US 11,502,956 B2
(45) Date of Patent: Nov. 15, 2022

(54) METHOD FOR CONTENT CACHING IN INFORMATION-CENTRIC NETWORK VIRTUALIZATION

(71) Applicant: Chongqing University of Posts and Telecommunications, Chongqing (CN)

(72) Inventors: Qilie Liu, Chongqing (CN); Xiaoxiao Wang, Chongqing (CN); Liqiang Zhuge, Chongqing (CN); Yanyu Wang, Chongqing (CN); Zheng Li, Chongqing (CN); Bin Cao, Chongqing (CN); Jingcheng Liu, Chongqing (CN); Fengfan Yang, Chongqing (CN)

(73) Assignee: Chongqing University of Posts and Telecommunications, Chongqing (CN)

( * ) Notice: Subject to any disclaimer, the term of this patent is extended or adjusted under 35 U.S.C. 154(b) by 79 days.

(21) Appl. No.: 16/979,134

(22) PCT Filed: Mar. 22, 2019

(86) PCT No.: PCT/CN2019/079277
§ 371 (c)(1),
(2) Date: Dec. 7, 2020

(87) PCT Pub. No.: WO2020/007073
PCT Pub. Date: Jan. 9, 2020

(65) Prior Publication Data
US 2021/0083976 A1 Mar. 18, 2021

(30) Foreign Application Priority Data
Jul. 4, 2018 (CN) .......................... 201810725306.1

(51) Int. Cl.
*H04L 45/74* (2022.01)
*H04L 45/00* (2022.01)
(Continued)

(52) U.S. Cl.
CPC ............ *H04L 45/742* (2013.01); *H04L 45/20* (2013.01); *H04L 47/34* (2013.01); *H04L 67/568* (2022.05)

(58) Field of Classification Search
CPC ....... H04L 45/742; H04L 45/20; H04L 47/34; H04L 67/2842; H04L 67/1097;
(Continued)

(56) References Cited

U.S. PATENT DOCUMENTS

2012/0047504 A1* 2/2012 Morris .................. G06F 9/5094
718/100
2013/0227048 A1 8/2013 Xie et al.

FOREIGN PATENT DOCUMENTS

CN 103052114 A 4/2013
CN 105049254 A * 11/2015
(Continued)

OTHER PUBLICATIONS

English Translation (10 PAGES) of CN-105049254-A, published Nov. 2015.*
(Continued)

*Primary Examiner* — Pankaj Kumar
*Assistant Examiner* — Eric Phu
(74) *Attorney, Agent, or Firm* — Jeenam Park

(57) ABSTRACT

A method for content caching in information centric network virtualization includes receiving, by a first node, a first data packet; in response to a cache distance identifier hop of the first data packet being less than a preset maximum cache distance, setting hop=hop+1 and sending the first data packet to a next node by the first node; in response to the hop being not less than the preset maximum cache distance and there being available cache space in the first node, setting hop=0, storing the first data packet, and sending the first data packet to the next node by the first node. The node deter-
(Continued)

mines whether to cache a data packet based on the cache distance identifier of the data packet, which comprehensively considers the cache energy consumption caused by caching the data packet in the node and the transmission energy consumption caused by transmission of the data packet in the link, thereby effectively reducing the total energy consumption of the network.

7 Claims, 2 Drawing Sheets

(51) Int. Cl.
    *H04L 47/34*     (2022.01)
    *H04L 67/568*     (2022.01)
(58) Field of Classification Search
    CPC ............... H04L 67/568; G06F 12/0802; G06F 12/0866; G06F 16/9574
    See application file for complete search history.

(56) References Cited

FOREIGN PATENT DOCUMENTS

| CN | 105635319 A | 6/2016 |
|---|---|---|
| CN | 108093056 A | 5/2018 |
| CN | 108183867 A | 6/2018 |
| CN | 108900618 A | 11/2018 |

OTHER PUBLICATIONS

International Search Report for Application No. PCT/CN2019/079277, dated Jun. 24, 19, 3 pgs.

Yonggong et al., "Performace Analysis and Optimization for In-Network Caching Replacement in Information Centric Networking," Journal of Computer Research and Development, 2015, 52(9): pp. 2046-2055.

\* cited by examiner

METHOD FOR CONTENT CACHING IN INFORMATION-CENTRIC NETWORK VIRTUALIZATION

BACKGROUND

Technical Field

The invention relates to a new network environment combining wireless network virtualization (WNV) and information-centric network (ICN): information-centric wireless network virtualization (ICWNV) network, in particular to a method for content caching in ICWNV.

Description of the Related Art

As one of the most promising architectures for next-generation networks, WNV can meet the needs of diverse applications by building a virtual network (VN) on the basis of the existing network while retaining the existing Internet. Network virtualization is the virtualization of network devices, that is, devices such as traditional routers and switches are enhanced so that they can support a large number of scalable applications. WNV technology solves the rigidity problem faced by the current Internet network architectures by abstracting common substrate infrastructure through virtualization technology, providing unified programmable interfaces, and mapping a plurality of VNs which are isolated from each other and have different topologies to the common substrate infrastructure, thereby providing users with differential services and realizing resource sharing. ICN network, as a new hotspot in the research of next-generation network architectures, replaces the existing end-centric communication mode with an information-centric communication mode which includes performing unified identification on content, and locating, routing and transmitting information based on the content identification, thereby making the network an integrated platform for information transmission, storage and service. One of the most important features in ICN is intra-network caching, which uses storage space in a node of the network to cache a copy of content and respond to a user request nearby, which can effectively reduce redundant traffic, ease network bandwidth pressure, and reduce the time for a user to access content, thereby improving the transmission efficiency in the process of accessing content resources by the user and the utilization of network resources, reducing network delay and network traffic, and improving network performance.

With the explosive growth of network data traffic today, the user not only expect that the network can provide traditional services such as computing resources and bandwidth resources, but also require the network to provide faster access to content resources. Therefore, researchers have proposed a virtualization network of information-centric wireless network, which uses ICN as the substrate network (SN), and VN as an arbitrary topology network. In the network environment where ICN and WNV are combined, not only infrastructure resources but also content resources can be shared between different service providers. Thus, not only the gains brought by virtualization, but also the benefits brought by intra-network caching can be realized.

In the ICWNV network, a virtual node carries content information required by a user, and through node mapping and link mapping, the substrate network provides sufficient CPU and bandwidth resources for node mapping and link mapping. Meanwhile, a mapping node will send a request for content required by the user, so that the SN also needs to provide the required content for the mapping node to fulfill the user's request. The content requested by the user may be accessed from a data center or from cache of an intermediate node. Accessing content through an intermediate node can greatly reduce the average number of hops to access content, reduce the user's response time, and improve network performance. However, the node has a relatively small size of cache space which will reach a saturation and stable state as the amount of different contents requested by the user increases according to ranges of node mapping and link mapping. At this time, if a new data packet arrives in a node, the node needs to determine whether to cache the incoming data packet and whether to replace the cached data packet in the node.

In the prior art, there are substantially two methods for a node to cache content. One is to push data packets to edge nodes in a universal caching manner, which can reduce the number of hops required for a user to access content to a certain extent, but will cause a large number of data packets to be cached in each node. The other one is to choose important nodes in the network to centrally cache data packets, which can reduce cache redundancy of data packets, but will increase the number of hops required for a user to access data packets.

The caching methods in the prior art consider whether to cache a data packet in a node and how to cache the data packet from the perspective of utilization of cache space and efficiency of accessing data for a user. However, in the actual network operation process, energy consumption of the network is also one of the important parameters for network performance, and distribution of nodes in the network (including transmission of data packets in a link and cache of data packets in a node) will cause energy consumption. The cache energy consumption of a data packet cached in a node is:

$$E_{i,k}^{cache} = P_{cache} size_k t$$

wherein, $E_{i,k}^{cache}$ is the cache energy consumption of a data packet $c_k$ cached in a node $v_i$; $P_{cache}$ is the cache power density of nodes in the network; $size_k$ is a data length of the data packet $c_k$, and t is the temporal length of the data packet $c_k$ in the node $v_i$.

The transmission energy consumption of a data packet transmitted in the link is:

$$E_{i,k}^{tr} = R_{i,k} size_k \{d_{ij,k}(P_{node} + P_{link}) P_{node}\}$$

wherein, $E_{i,k}^{tr}$ is energy consumption caused by requesting by a user a data packet $c_k$ in a node $v_i$, obtaining response from any node $v_j$, and transmitting the data packet $c_k$ to the node $v_i$; $R_{i,k}$ is the request rate of accessing content $c_k$ by the user in the node $v_i$; $d_{ij,k}$ is the number of hops required for the data packet $c_k$ to be transmitted from node $v_j$ to node $v_i$, $P_{node}$ is the node energy density, and $P_{link}$ is the link energy density.

For a specific network, $P_{cache}$, $P_{node}$, and $P_{link}$ are fixed values determined by the device parameters in the network.

The total energy consumption in the network $E_{total}$ is:

$$E_{total} = \sum_{k=1}^{K} \left\{ \sum_{i=1}^{I} \{x_{i,j,k} \{R_{i,k} size_k \{d_{ij,k}(P_{node} + P_{link}) + P_{node}\}\} + y_{i,k} \{P_{cache} size_k t\}\} \right\}$$

wherein, K is the number of data packets cached in the network, and I is the number of nodes in the network; $x_{ij,k}$ indicates whether a user requests a data packet $c_k$ in a node $v_i$, if yes, $x_{ij,k}=1$, otherwise $x_{ij,k}=0$; and $y_{i,k}$ indicates whether the data packet $c_k$ is cached in a node $v_i$, if yes, $y_{i,k}=1$, otherwise $y_{i,k}=0$.

The problem with the prior art caching solution is that it does not consider the problem of network energy consumption, which is not conducive to the reduction of network operation energy consumption.

BRIEF SUMMARY

In order to solve the above problem existing in the prior art, the present disclosure proposes a method for content caching in information-centric wireless network virtualization to reduce the total energy consumption of the information-centric wireless network virtualization network.

In order to achieve the above objective, the present disclosure adopts the technical solutions as follows.

There is provided a method for content caching in information-centric network virtualization, comprising:
  receiving, by a first node, a first data packet;
  in response to a cache distance identifier hop of the first data packet being less than a preset maximum cache distance, setting hop=hop+1 and sending the first data packet to a next node by the first node; and
  in response to the hop being not less than the preset maximum cache distance and there being available cache space in the first node, setting hop=0, storing the first data packet, and sending the first data packet to the next node by the first node.

The method further comprises:
  in response to the hop being not less than the preset maximum cache distance and there being no available cache space in the first node, and
  in response to a request frequency weight of the first data packet being less than that of a second data packet, setting hop=hop+1 and sending the first data packet to the next node by the first node;
  wherein, the second data packet is a data packet with the smallest request frequency weight stored in the cache space of the first node.

The method further comprises:
  in response to the request frequency weight of the first data packet being not less than that of the second data packet, discarding the second data packet, storing the first data packet, setting hop=0, and sending the first data packet to the next node by the first node.

The method further comprises:
  in response to the hop being not less than the preset maximum cache distance and there being no available cache space in the first node, calculating a total energy consumption $E_{total\_k}$ in the network caused by discarding the second data packet stored in the cache space of the first node and storing the first data packet; and
  in response to $E_{total\_k}$ being greater than a current total energy consumption $E_{total}$ in the network, setting hop=hop+1, and sending the first data packet to the next node by the first node;
  wherein, the second data packet is a data packet with the smallest request frequency weight stored in the cache space of the first node.

The method further comprises:
  in response to $E_{total\_k}$ being not greater than the current total energy consumption $E_{total}$ in the network and a request frequency weight of the first data packet being less than that of the second data packet, setting hop=hop+1 and sending the first data packet to the next node by the first node.

The method further comprises:
  in response to $E_{total\_k}$ being not greater than the current total energy consumption $E_{total}$ in the network and the request frequency weight of the first data packet being not less than that of the second data packet, setting hop=0, discarding the second data packet, storing the first data packet, setting $E_{total}=E_{total\_k}$, and sending the first data packet to the next node by the first node.

Preferably, the request frequency weight is a frequency at which a requested data packet $c_m$ is received by the first node within a time period T before a current time, wherein, m is a sequence number of the data packet, m=1, 2, ... K.

Preferably, the request frequency weight is:

$$\overline{count_m} = \sum_{n=1}^{N} \theta_n count_m(T_n);$$

wherein, $\overline{count_m}$ is the request frequency weight of the data packet $c_m$;
  $count_m(T_n)$ is a frequency at which the requested data packet $c_m$ is received by the first node within a time period $T_n$;
  $\theta_n$ is a weight of the preset time period $T_n$, $\theta_1 > ... > \theta_n ... > ... > \theta_N > 0$; and
  n is a sequence number of the time period, n=1, 2, ... N, in which the greater n is, the greater a temporal distance between the time period $T_n$ and the current time T.

In embodiments of the present disclosure, the node determines whether to cache a data packet based on the cache distance identifier of the data packet, which comprehensively considers the cache energy consumption caused by caching the data packet in the node and the transmission energy consumption caused by transmission of the data packet in the link, thereby effectively reducing the total energy consumption of the network.

DETAILED DESCRIPTION

In order to better illustrate the technical solutions of the present disclosure, detailed description of the embodiments of the disclosure will be made below with reference to the accompanying drawings.

In an ICWNV network, the network is not concerned with the storage location of content, but only with the content itself. Content in the network use its names rather than IP addresses as the identification of the content. There are two types of packets in the ICWNV network: interest packet and data packet. When virtual network requests (VNRs) arrive, the ICWNV network will first provide enough CPU and bandwidth resources for node mapping and link mapping of the VNRs. Next, the mapping node will retrieve, by routing, a neighboring node or data center containing corresponding data according to the user's interest packet. The data packet is then transmitted to the mapping node along a path opposite to the interest packet.

The specific process for a user to request a data packet and access a data packet includes the steps as follows:
(1) The network first complete node mapping and link mapping according to the request of the user, while the mapping node will send out an interest packet according to the request of the user;
(2) A node will check whether there is a data packet corresponding to the request in its cache space, and if yes, transmitting the data packet back to the mapping node;
(3) Otherwise, the node will query whether a pending request table contains an entry corresponding to the request:
    if yes, an interface number with which the interest packet enters is added to an interface list of the corresponding entry, which indicates that other users have made a request for the same data packet and passed through the node; and
    otherwise, a new entry is created in the pending request table and a forwarding information base of the node is queried, and then the request is forwarded to a next hop node; and
(4) When the data packet arrives, the node will query the pending request table, and if there is a request entry corresponding to the data packet in the pending request table, the data packet is forwarded from an interface in the interface list corresponding to the entry and stored in cache space (CS) of an appropriate node according to a corresponding storage strategy.

In embodiments of the present disclosure, a cache distance identifier hop is added in the data packet. When the data packet is cached in the current node, the node sets the hop of the data packet to 0; otherwise, the node sets hop=hop+1 for the data packet.

Embodiment 1

Figure 1:
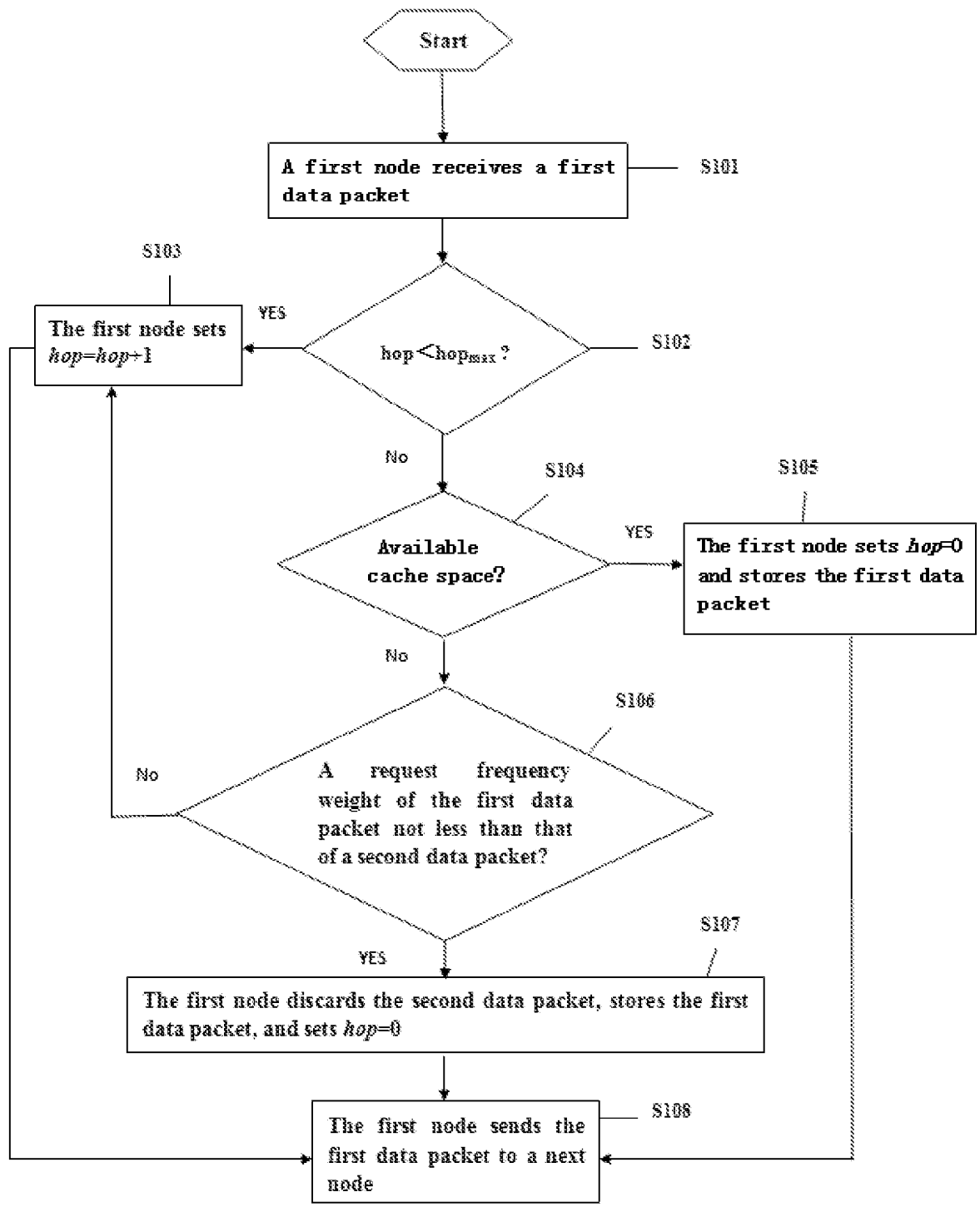
FIG. 1 is a flowchart of a method according to Embodiment 1 of the present disclosure.

This embodiment is a preferred implementation of a method for caching content in ICWNV according to the present disclosure. FIG. 1 shows the process of this embodiment, including the steps as follows:

At step S101, a first node receives a first data packet.

At step S102, the first node determines whether a cache distance identifier hop of the first data packet is less than a preset maximum cache distance $hop_{max}$, and if yes, proceeds to step S103, otherwise, proceeds to step S104, wherein, the hop is used to indicate the number of hops from the node in which the first data packet is cached to the first node.

The $hop_{max}$ is a cache distance preset, through experimental data or simulation results according to parameters of the specific network scale, node cache power density, node energy density and link energy density, to realize the lowest estimated average energy consumption of the network under the premise of meeting network transmission efficiency requirements.

In this embodiment, the hop is stored in the first data packet.

At step S103, the first node sets hop=hop+1, and proceeds to step S108.

At step S104, the first node determines whether there is available cache space, and if yes, proceeds to step S105, otherwise, proceeds to step S106.

At step S105, the first node sets hop=0 and stores the first data packet, then proceeds to step S108.

At step S106, the first node determines whether a request frequency weight of the first data packet is not less than that of a second data packet, and if yes, proceeds to step S107, otherwise, proceeds to step S103.

As a preferred implementation of this embodiment, in this step, the request frequency weight $\overline{count_m}$ is obtained by calculating a frequency at which the requested data packet $c_m$ is received by the first node within a time period T before a current time, wherein m is a sequence number of the data packet, m=1, 2, ... K.

As another preferred implementation of this embodiment, in this step, the request frequency weight $\overline{count_m}$ is obtained by:

$$\overline{count_m} = \sum_{n=1}^{N} \theta_n count_m(T_n);$$

wherein, $count_m(T_n)$ is a frequency at which the requested data packet $c_m$ is received by the first node within a time period $T_n$; $\theta_n$ is a weight for accessing $c_m$ within the preset time period $T_n$, $\theta_1 > \ldots > \theta_n \ldots > \ldots > \theta_N > 0$; and n is a sequence number of the time period, n=1, 2, ... N, in which the greater n is, the greater a temporal distance between the time period $T_n$ and the current time T.

At step S107, the first node discards the second data packet, stores the first data packet, and sets hop=0.

At step S108, the first node forwards the first data packet to a next node.

In this embodiment, the network sets an identifier in the data packet to indicate a number of hops from the current node to a node in which the data packet is cached: cache distance identifier. When the current node receives a data packet, it first determines whether the cache distance identifier of the data packet is less than a preset maximum cache distance. If yes, the current node does not cache the data packet, otherwise, the current node further determines whether there is available cache space. If yes, the current node stores the data packet, otherwise, the current node discards the one that has the lowest request frequency weight among the data packet and those already cached in the current node. In this embodiment, the node determines whether to cache a data packet based on the cache distance identifier of the data packet, which comprehensively considers the cache energy consumption caused by caching the data packet in the node and the transmission energy consumption caused by transmission of the data packet in the link, thereby effectively reducing the energy consumption of data packet distribution across nodes. Meanwhile, when the cache space is full, a data packet to be discarded is determined based on the request frequency weight of the data packet, which ensures that the data cached by the node is the data with a high request frequency, thereby improving the efficiency for a user to access data.

In the preferred implementation of this embodiment, the time period for calculating the request frequency of a data packet is further subdivided, and the request frequency weight for each time period is set according to the distance between the time period and the current time, which effectively avoids a relatively high total request frequency due to the fact that the request frequency is high within an early time period and is low within a recent time period, thereby further improving the efficiency for a user to access data.

Embodiment 2

Figure 2:
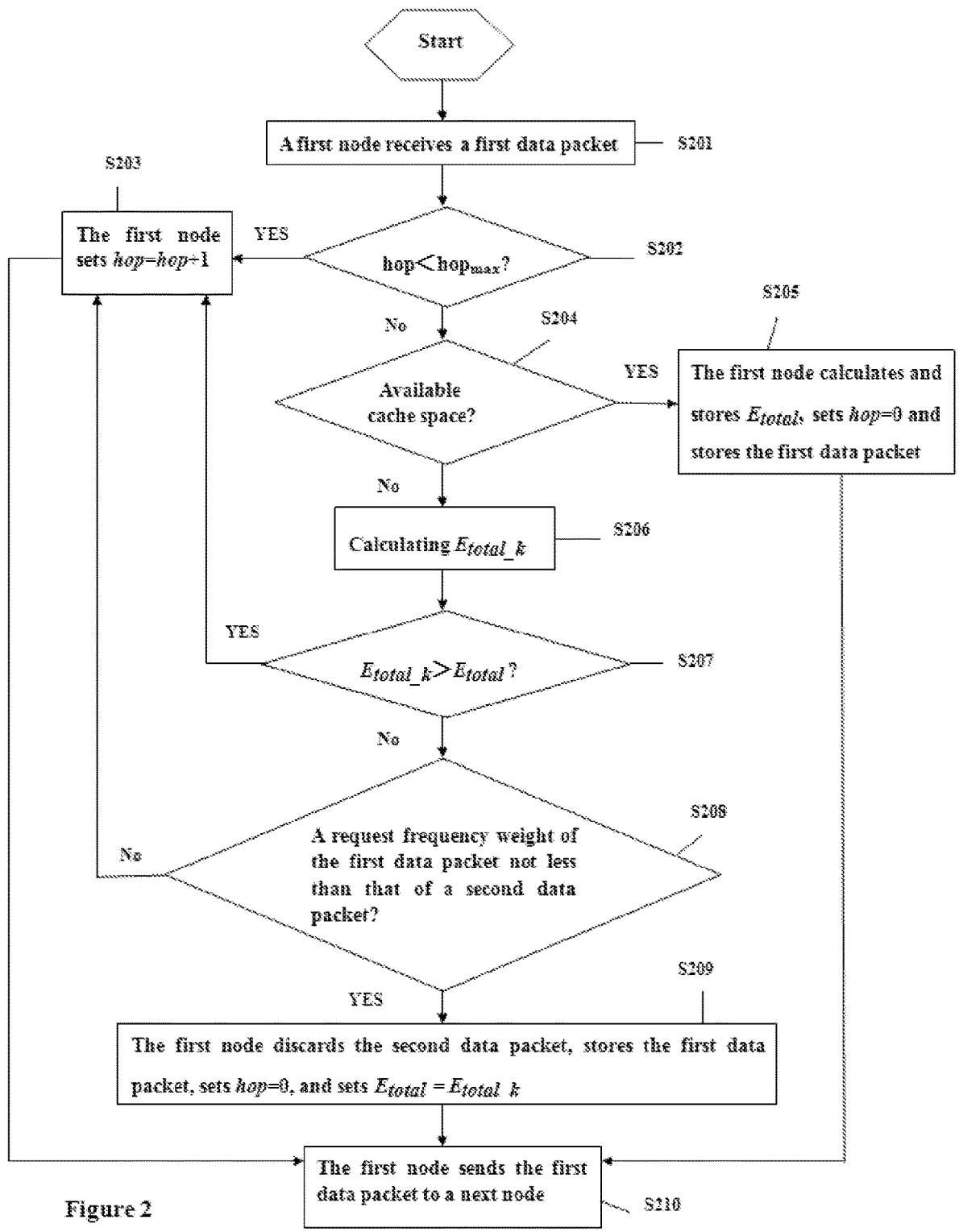
FIG. 2 is a flowchart of a method according to Embodiment 2 of the present disclosure.

This embodiment is another preferred implementation of a method for caching content in ICWNV according to the present disclosure. FIG. 2 shows the process of this embodiment, including the steps as follows:

At step S201, a first node receives a first data packet.

At step S202, the first node determines whether a cache distance identifier hop of the first data packet is less than a preset maximum cache distance $hop_{max}$, and if yes, proceeds to step S203, otherwise, proceeds to step S204, wherein, the hop is used to indicate the number of hops from the node in which the first data packet is cached to the first node.

The $hop_{max}$ is a cache distance preset, through experimental data or simulation results according to parameters of the specific network scale, node cache power density, node energy density and link energy density, to realize the lowest estimated average energy consumption of the network under the premise of meeting network transmission efficiency requirements.

In this embodiment, the hop is stored in the first data packet.

At step S203, the first node sets hop=hop+1, and proceeds to step S210.

At step S204, the first node determines whether there is available cache space, and if yes, proceeds to step S205, otherwise, proceeds to step S206.

At step S205, the first node calculates and stores the total energy consumption after caching the first data packet, sets hop=0 and stores the first data packet, then proceeds to step S210.

At step S206, calculating the total energy consumption $E_{total\_k}$ of the network after the first node discards the second data packet stored in its cache space and stores the first data packet:

$$E_{total\_k} = \sum_{i=1}^{I} \{x_{ij,k}\{R_{i,k}size_k\{d_{ij,k}(P_{node}+P_{link})+P_{node}\}\}+y_{i,k}\{P_{cache}size_k t\}\} + \sum_{l \neq k, l=1}^{K}\left\{\sum_{i=1}^{I}\{R_{i,l}x_{ij,k}\{size_l\{d_{ij,l}(P_{node}+P_{link})+P_{node}\}\}+y_{i,l}\{P_{cache}size_l t\}\}\right\};$$

wherein, i, j are sequence numbers of a node respectively, i, j=1, 2, ... I, i≠j, k is a sequence number of the first data packet, and l is a sequence number of the data packet, l=1, 2, ... K, l≠k, and wherein, the second data packet is a data packet with the smallest request frequency weight stored in the cache space of the first node.

At step S207, the first node determines whether $E_{total\_k}$ is greater than a current total energy consumption $E_{total}$ in the network, and if yes, proceeds to step S203, otherwise, proceeds to step S208.

At step S208, the first node determines whether a request frequency weight of the first data packet is not less than that of a second data packet, and if yes, proceeds to step S209, otherwise, proceeds to step S203.

As a preferred implementation of this embodiment, in this step, the request frequency weight $\overline{count_m}$ is obtained by calculating a frequency at which the requested data packet $c_m$ is received by the first node within a time period T before a current time, wherein m is a sequence number of the data packet, m=1, 2, ... K.

As another preferred implementation of this embodiment, in this step, the request frequency weight $\overline{count_m}$ is obtained by:

$$\overline{count_m} = \sum_{n=1}^{N} \theta_n count_m(T_n);$$

wherein, $count_m(T_n)$ is a frequency at which the requested data packet $c_m$ is received by the first node within a time period $T_n$; $\theta_n$ is a weight for accessing $c_m$ within the preset time period $T_n$, $\theta_1 > ... > \theta_n ... > ... > \theta_N > 0$; and n is a sequence number of the time period, n=1, 2, ... N, in which the greater n is, the greater a temporal distance between the time period $T_n$ and the current time T.

At step S209, the first node sets hop=0, discards the second data packet, stores the first data packet, and sets $E_{total}=E_{total\_k}$.

At step S210, the first node forwards the first data packet to a next node.

On the basis of Embodiment 1, this embodiment further reduces the total energy consumption of the network by determining the data packet to be discarded based on determination of the total energy consumption after caching data packet when the cache space is full.

In the preferred implementation of this embodiment, the time period for calculating the request frequency of a data packet is further subdivided, and the request frequency weight for each time period is set according to the distance between the time period and the current time, which effectively avoids a relatively high total request frequency due to the fact that the request frequency is high within an early time period and is low within a recent time period, thereby further improving the efficiency for a user to access data.

It should be noted that the above-mentioned embodiments are only used for illustrating, but not for limiting, the technical solutions of the present disclosure. Though the disclosure is described in detail with reference to the preferred embodiments, it should be understood by those skilled in the art that the technical solutions of the disclosure can be modified or substituted with equivalents without departing from the purpose and scope of the technical solutions of the present disclosure, which should fall within the scope defined by the following claims.

The invention claimed is:

1. A method for content caching in information-centric network virtualization, comprising:
   receiving, by a first node, a first data packet;
   in response to a cache distance identifier hop of the first data packet being less than a preset maximum cache distance, setting hop=hop+1 and sending the first data packet to a next node by the first node; and
   in response to the hop being not less than the preset maximum cache distance and there being available cache space in the first node, setting hop=0, storing the first data packet, and sending the first data packet, to the next node by the first node;
   in response to the hop being not less than the preset maximum cache distance and there being no available cache space in the first node, and in response to a request frequency weight of the first data packet being less than that of a second data packet, setting hop=hop+1 and sending the first data packet to the next node by the first node;

wherein, the second data packet is a data packet with the smallest request frequency weight stored in the cache space of the first node;
wherein the request frequency weight is:

$$\overline{count_m} = \sum_{n=1}^{N} \theta_n count_m(T_n);$$

wherein, $\overline{count_m}$ is the request frequency weight of the data packet $c_m$;
  $count_m(T_m)$ is a frequency at which the requested data packet $c_m$ is received by the first node within a time period $T_n$;
  $\theta_n$ is a weight of the preset time period $T_n$, $\theta_1 > \ldots \theta_n \ldots > \ldots > \theta_N > 0$; and
  n is a sequence number of the time period, n=1, 2, ... N, in which the greater n the greater a temporal distance between the time period $T_n$ and the current time T.

2. The method of claim 1, further comprising:
in response to the request frequency weight of the first data packet being not less than that of the second data packet, discarding the second data packet, storing the first data packet, setting hop=0, and sending the first data packet to the next node by the first node.

3. The method of claim 1, wherein the request frequency weight is a frequency at which a requested data packet $c_m$ is received by the first node within a time period T before a current time, wherein, m is a sequence number of the data packet, m=1, 2, ... K.

4. The method of claim 1, further comprising:
in response to the hop being not less than the preset maximum cache distance and there being no available cache space in the first node, calculating a total energy consumption $E_{total\_k}$ in the network caused by discarding the second data packet stored in the cache space of the first node and storing the first data packet; and
in response to $E_{total\_k}$ being greater than a current total energy consumption $E_{total}$ in the network, setting hop=hop+1 and sending the first data packet to the next node by the first node;
wherein, the second data packet is a data packet with the smallest request frequency weight stored in the cache space of the first node.

5. The method of claim 4, further comprising:
in response to $E_{total\_k}$ being not greater than the current total energy consumption $E_{total}$ in the network and a request frequency weight of the first data packet being less than that of the second data packet, setting hop=hop+1 and sending the first data packet to the next node by the first node.

6. The method of claim 5, further comprising:
in response to $E_{total\_k}$ being not greater than the current total energy consumption $E_{total}$ in the network and the request frequency weight of the first data packet being not less than that of the second data packet, setting hop=0, discarding the second data packet, storing the first data packet, setting $E_{total}=E_{total\_k}$, and sending the first data packet to the next node by the first node.

7. The method of claim 5, wherein the request frequency weight is a frequency at which a requested data packet $c_m$ is received by the first node within a time period T before a current time, wherein, m is a sequence number of the data packet, m=1, 2, ... K.

* * * * *